Sept. 13, 1932.  E. B. BINFORD  1,877,443
CUTTING AND GROOVING MACHINE
Filed Feb. 14, 1930  2 Sheets-Sheet 1
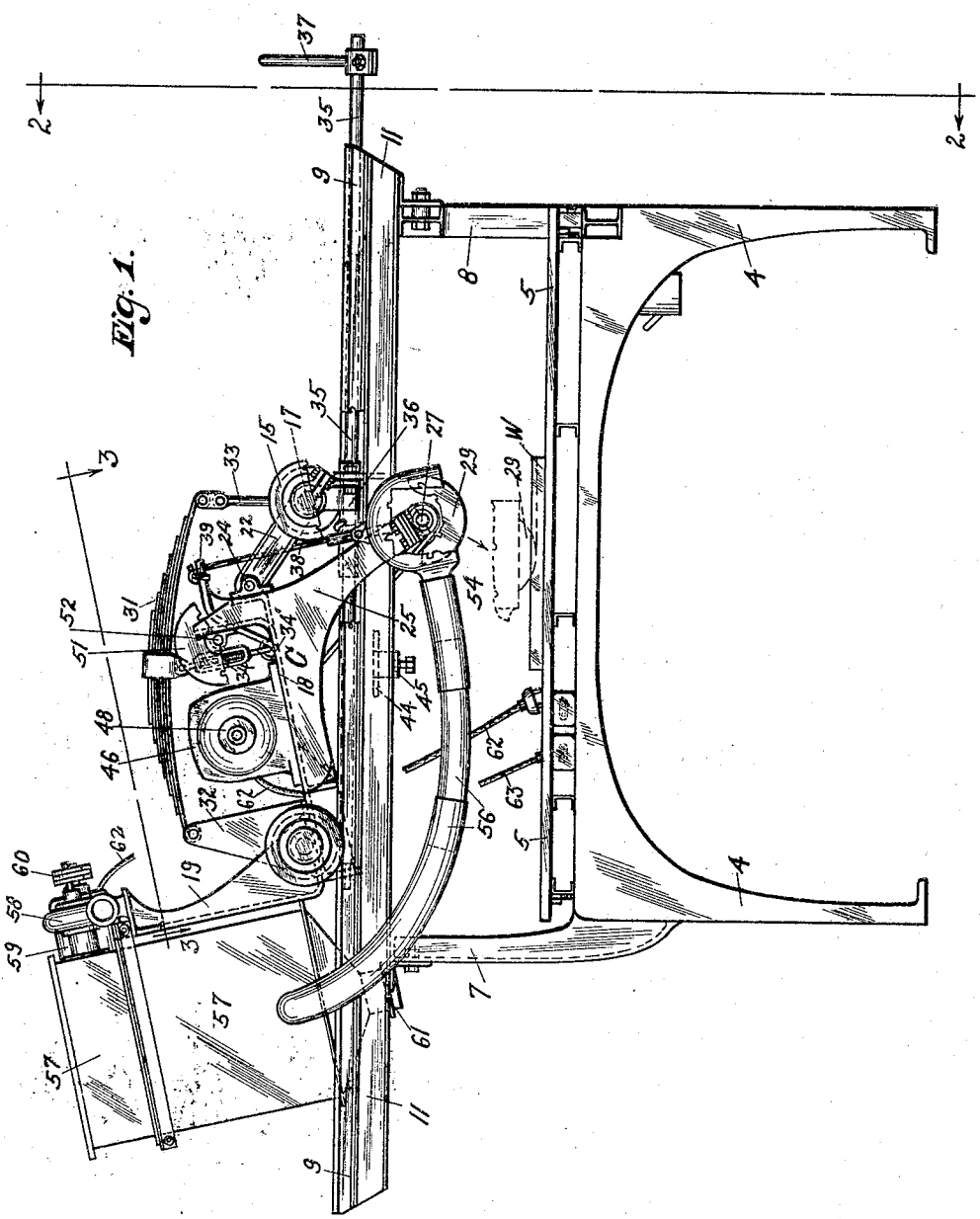

Sept. 13, 1932. E. B. BINFORD 1,877,443
CUTTING AND GROOVING MACHINE
Filed Feb. 14, 1930 2 Sheets-Sheet 2
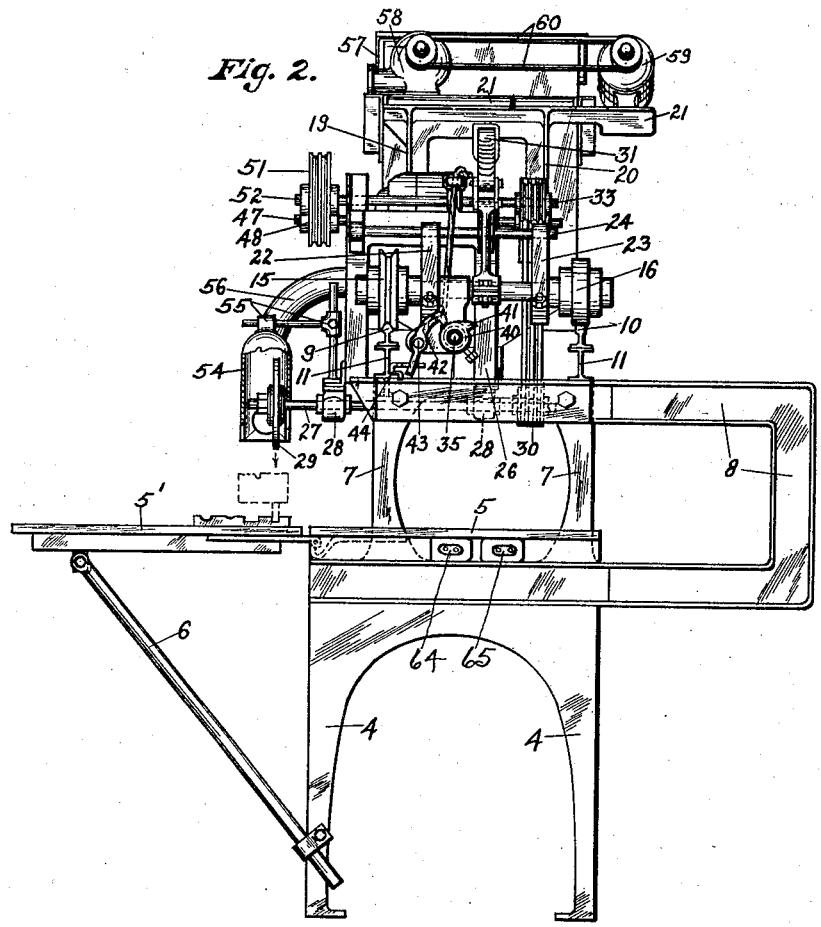
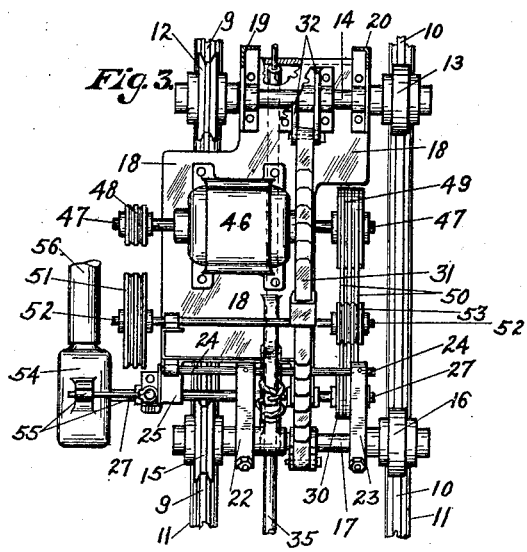
INVENTOR.
Edwin B. Binford
BY
ATTORNEY.

Patented Sept. 13, 1932

1,877,443

UNITED STATES PATENT OFFICE

EDWIN B. BINFORD, OF BEVERLY HILLS, CALIFORNIA, ASSIGNOR OF ONE-HALF TO CONTINENTAL BUILDING SPECIALTIES, INC., OF LOS ANGELES, CALIFORNIA

CUTTING AND GROOVING MACHINE

Application filed February 14, 1930. Serial No. 428,420.

My invention relates to cutting and grooving machines, and more particularly to a machine which is specially designed and constructed for operating cutting wheels to be moved into and away from the work, and more particularly designed for use in cutting and grooving and shaping composition material which is very hard and when cut or grooved creates a considerable amount of dust therefrom.

The machine is particularly designed for cutting and grooving and shaping the surface of a hard board or sheet of composition material known as "Zenitherm" and which is so hard that a saw will not stand up under the severity of the work, and instead of using a saw for this type of material, a cutting wheel or disc of carborundum or the like which can be run at high speed and will cut into and through the surface of these sheets of hard material in a way to leave a smooth cut or groove, thus making it possible to decorate the surface with various cuts and grooves, and also to cut the material to fit into corners and agles as a surface finishing.

In order to explain my invention, I have illustrated one practical embodiment thereof on the accompanying two sheets of drawings, which I will now describe.

Figure 1 is a side elevation of a machine embodying my invention;

Figure 2 is an end elevation thereof taken from the line 2—2 of Fig. 1; and

Figure 3 is a top plan view thereof, taken from the line 3—3 on Fig. 1.

Referring in detail to the drawings, I have shown a supporting table having the legs 4, 4, and the top 5, for supporting the work W., with an extension to one side and designated 5′, with supporting braces, as at 6, whereby the extension can be let down out of the way when not in use. At the rear end of the structure are upright supporting brackets 7, 7, and at the forward end is a laterally extending yoke 8, to give clearance in the plane of the table or top 5. Mounted upon the brackets 7, 7, and yoke 8, are two tracks 9 and 10, supported on I-beams 11, 11, as seen in Figs. 1 and 2, the track 9 being shown of inverted V-form, while the track 10 is flat or rail form, as shown.

Mounted to move back and forth upon said tracks 9 and 10, is a carrier, designated as a whole C, and including two rear wheels 12 and 13, on axle 14, and two front wheels 15 and 16, on shaft 17, with a jointed supporting frame therebetween made up of a supporting platform 18, supported on the rear shaft 14, by means of two brackets 19 and 20, on the top of which brackets is a supporting platform 21, and by two supporting arms 22 and 23, pivotally mounted on the front axle 17 and at their upper ends having a shaft 24, and to which the forward end of the platform 18 is pivotally connected and supported. At one side of the supporting platform 18 is a downwardly and forwardly extending arm 25, with a second similar arm 26 between the tracks 9 and 10, and in the lower ends of these arms or extensions of the supporting platform is a power shaft 27, in the bearings 28, 28, on the outer end of which shaft 27 is a cutter wheel 29. At the opposite end of said power shaft is a driving pulley 30.

Said carrier is yieldingly supported with its joint or bearing shaft 24 raised, as shown in full lines in Fig. 1, by means of a leaf spring 31, one end of which is supported on brackets 32, 32, on the rear axle or shaft 14, and at its forward end said spring is supported on an arm 33, pivotally mounted on the forward axle 17. The middle of the spring is provided with a suspending buckle 34, by means of which it is adjustably connected to said supporting platform, as at 34′. Thus by means of this spring and its connections, the supporting platform, with its arm extensions 25 and 26, and the cutter wheel 27, is yieldingly supported in its raised or normal position, as seen in Fig. 1.

As a means for moving it downwardly for the purpose of moving the cutter wheel 27 into the work, an operating rod 35 is mounted in a suitable bracket 36, under the forward axle 17, and is provided at its outer end with a handle or lever 37, while at its rearward end it has a cable 38 wound around it and connected at its upper end to an arm 39, projecting upwardly from the platform 18, as seen in Fig. 1, whereby as said operating rod 35 is turned by its handle 37, through said cable, said supporting table 18 and the mechanism supported thereon are moved downwardly to move the cutter wheel 29 to the work, as indicated in light broken lines, Fig. 1. When released, the spring raises said platform and the cutter wheel away from the work. As a means for holding said platform in its down position, said rod 35 is provided with a sleeve 40, having a prong 41 thereon, adapted to latch with a latch hook 42, pivotally mounted at 43, as shown in Fig. 2, so that when said shaft 35 is turned to the left until said prong 41 is caught by said hook or latch 42, the parts will be held until the latch 42 is released and the shaft 35 allowed to return. A trip finger 44 is secured at 45 in the path of travel of said latch hook 42, so that when said carrier reaches a rearward position, the lower end of said latch hook engages said finger 44 and is automatically released thereby and said carrier is allowed to rise under the tension of its supporting spring 31. Said trip finger 44 is adjustable.

The power for operating the cutter wheel is shown as an electric motor, designated 46, mounted on the supporting platform 18, with its shaft 47 extended at both ends and provided with driving pulleys 48 and 49, of triple form, with a triple belt 50 from the pulley 49 to the driving pulley 30, on the shaft 27, which carries the cutter wheel 29. This direct drive is shown. If a slower drive connection is desired, as when a saw is to be used, then pulley 48 is connected with a larger pulley 51, on the end of a shaft 52, mounted on the supporting table 18, and carrying at its opposite end a small pulley 53, and this pulley 53 is then connected to the drive pulley 30, as will be understood from Figs. 2 and 3.

Inasmuch as the composition material which constitutes the work W causes a considerable dust as the cutter wheel is forced through it, a hood 54 is mounted over the cutter wheel 29, and adjustably held in place by means of a bracket arrangement 55, clear from Fig. 2. Said hood is connected by means of a pipe 56 with a dust collecting box 57, of the vacuum type, and with which is connected a suction blower 58, mounted on the top of platform 21, and driven from a motor 59, with belt connection 60, as shown in Figs. 1 and 2. The dust collector can be of any suitable type of well known collectors in which the dust matter is screened from the air as it is sucked into the dust collector, the air being discharged from the blower in the usual manner. The collected dust matter is removed from the discharge end of the collector, as at 61. The electric cables are designated 62, 63, with suitable switches at the forward end of the machine, designated 64, 65, for convenient control. This collected dust matter from the product is also usable for making a filler for filling in joints.

Thus I have provided a simple, practical and easily operated machine for cutting and grooving sheets of material, and particularly composition which is hard and where cutter wheels made of carborundum, or other like material, is used for cutting hard substances. The carrier is easily moved by hand back and forth upon the tracks and the supporting platform and the operating mechanisms thereon are easily moved to and from the work.

I claim:

1. In a cutting and grooving machine, in combination, a supporting track, a carrier mounted to move on said track, a cutting wheel carried by said carrier with driving connections for driving the same, power means for driving said cutting wheel through said connections, said carrier being jointed and adapted at its joint to be raised and lowered to move said cutter wheel to and from the work, a spring normally holding said carrier in its raised position, and means for manually moving said carrier joint downwardly to control the position of said cutter wheel.

2. In a cutting and grooving machine, in combination, a supporting track, a jointed carrier moving upon said track with its joint intermediate its ends, spring means holding said joint in a raised position, a cutter wheel on said carrier and raised with said joint away from the work, means for manually moving said joint and said cutter wheel down to bring the cutter wheel into engagement with the work, latch means for holding said parts in the down position, means for automatically releasing them at a predetermined position to be raised to their up position, and power means for driving said cutter wheel.

3. In a machine of the character referred to, in combination with a track, a carrier having wheels at its forward and rearward ends to run on said track, said carrier having a jointed frame, with its joint intermediate its opposite ends and normally above the level of its wheel axes, a spring yieldingly holding said jointed frame in its up position, a cutter wheel carried on said jointed frame and normally projecting below said track and adapted to be moved down to the work, and means for manually moving said carrier frame downwardly at its joint to move said cutter wheel to and from the work, and power means with connections for driving said cutter wheel.

4. In a machine of the character referred to, in combination with a track, a carrier having wheels at its opposite ends to run on said track, said carrier having a jointed frame normally raised at the joint, a spring supporting said frame in its raised position so that it can be moved down at its joint to an operating position, a cutter wheel carried by said frame and moved therewith and adapted to be moved downwardly to the work by moving the joint of said frame downwardly, means for manually moving said frame downwardly to move said cutter wheel, power means connected with said cutter wheel for driving the same, latch means for holding said frame and cutter wheel in operating position during its travel on said track, and means for releasing the same.

5. In a machine of the character referred to, in combination with a supporting frame and track, a carrier moving on said track, said carrier having a part yieldingly supported in a raised and inoperative position, said part carrying a cutter wheel, power means mounted upon and moving with said carrier and operatively connected for driving said cutter wheel, means for manually moving said part and cutter wheel to the work, latch means for holding said cutter wheel and part in the operative position, and means for automatically releasing said part and cutter wheel to permit it to be raised at a predetermined position.

6. In a machine of the character referred to, in combination with a supporting frame and track, a carrier moving on said track, a part movably and yieldingly held on said carrier and supporting a cutter wheel, power means operatively connected with said cutter wheel for driving the same, means for manually moving said part and said cutter wheel downwardly to the work and for moving said carrier along said track, latch means for holding said parts in operative position, means for automatically releasing said latch means at a predetermined position to permit said part and said cutter wheel to move away from said work, a dust hood over said cutter wheel, and a dust collector connected with said hood for collecting dust from under said hood, substantially in the manner indicated.

7. In a machine of the character referred to, in combination with a supporting track, a carrier moving thereon and having wheels in front and in the rear and a jointed frame connecting said front and rear wheels, a spring yieldingly suspending the jointed frame and moving therewith, a part on said frame movable therewith and extending downwardly below said track, a cutter wheel carried by said part and movable therewith to and from the work, power means connected for driving said cutter wheel, manually operable means for moving said part and said cutter wheel to said work, latch means holding said cutter wheel to the work, means automatically releasing said latch means at a predetermined position, and means over said cutter wheel for gathering the dust made thereby.

Signed at Los Angeles, Los Angeles County, California, this 8th day of February, 1930.

EDWIN B. BINFORD.